United States Patent Office.

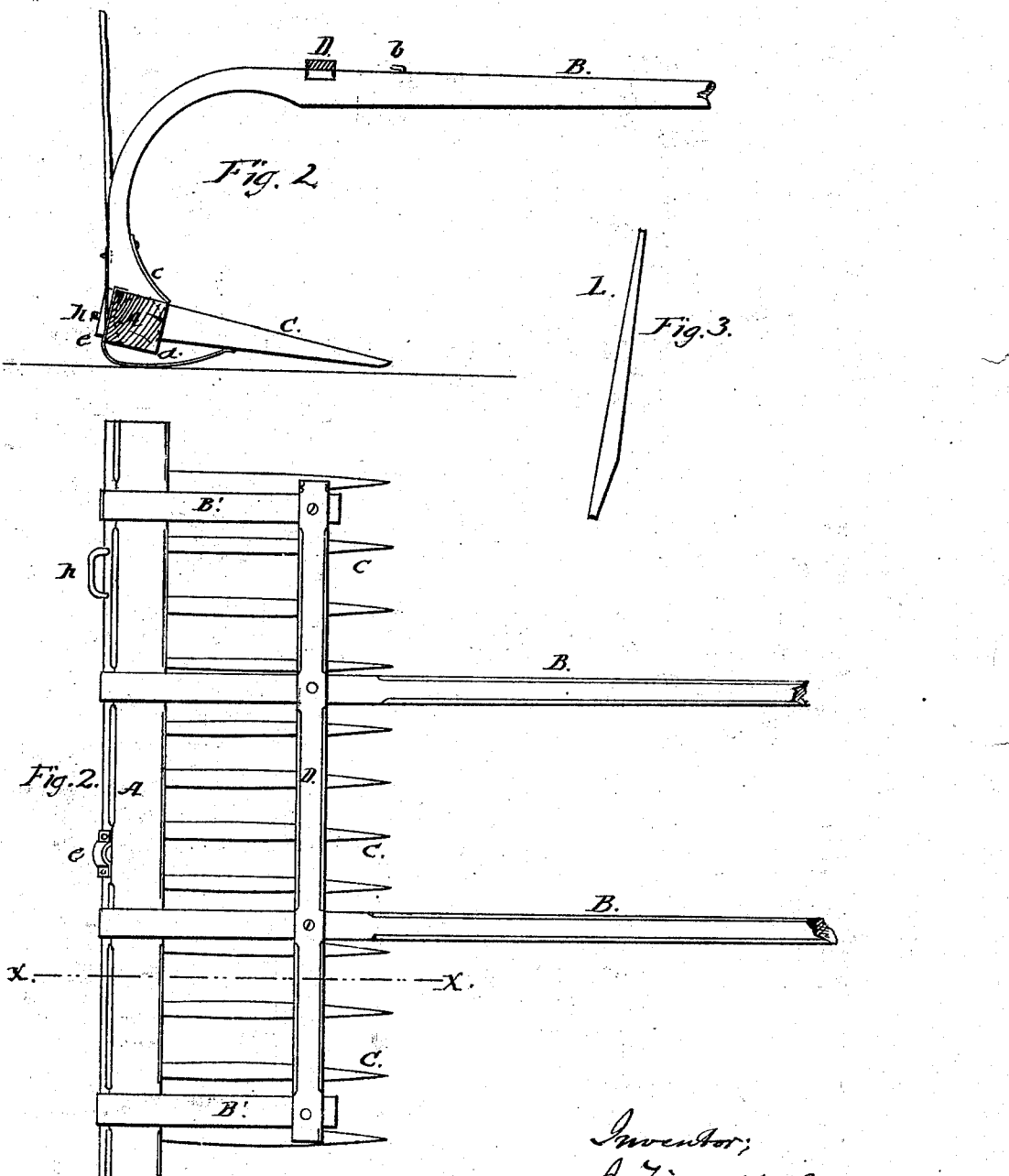

JOHN ZIMMERMAN, OF POWHATAN, MARYLAND.

Letters Patent No. 68,140, dated August 27, 1867.

IMPROVEMENT IN HORSE-RAKES.

*The Schedule referred to in these Letters Patent and making part of the same.*

TO ALL WHOM IT MAY CONCERN:

Be it known that I, J. ZIMMERMAN, of Powhatan, in the county of Baltimore, and State of Maryland, have invented certain new and useful Improvements in Hay-Gatherers and Conveyers; and I do hereby declare that the following is a full, clear, and exact description thereof, reference being had to the accompanying drawings, making part of this specification, and to the letters of reference marked thereon, like letters indicating li parts wherever they occur.

To enable others skilled in the art to construct and use my invention, I will proceed to describe it.

My invention consists in a novel construction of an implement whereby it is adapted for use both as a rake and as a vehicle for conveying the hay to the stack or other place of deposit; thus dispensing with the use of a cart or wagon, and also the labor of pitching the hay on and off of the same.

Figure 1 is a vertical transverse section taken on the line $x\ x$ of fig. 2.

Figure 2 is a top plan view of the same.

To construct my implement I take a long bar of wood, A, and insert along one of its sides or faces a series of long wooden teeth, C, as represented in the drawing, these teeth being constructed like the teeth of the ordinary or old-style horse hay-rake. Under the bar A, near each end, and in the centre, also, if desired, I attach a block, $a$, which extends forward for some distance underneath the tooth where it is located, as represented in fig. 1. The front end of this block is rounded or inclined upward similar to a sled-runner, but less abrupt in its rise at the front, and it projects somewhat below the line of the bar A, thus forming a runner or support, which will slightly raise the under side of the bar A above the surface of the earth, and thus enable it to be drawn over the ground without catching on any slight obstruction, such as a protruding root or stone, &c. By the application of this block or runner $a$ the teeth C are made to incline slightly forward, thus giving them a tendency to run into the ground, which tendency is counteracted by slightly bevelling their under sides at the points, as shown in fig. 1. A pair of shafts, B, having their rear ends curved, as shown in fig. 1, are attached at their lower ends to the head or bar A by means of an iron strap or band, $c$, which, being fastened to the end of the shaft on one side, passes around the head A, which is journalled at that point and has its opposite end attached to the opposite side of the shaft B, as represented in fig. 1, the head or bar A being free to turn loosely in its attachments to the shafts B. A cross-bar, D, is bolted transversely of the shafts B, and extends some distance beyond, at each end, where it is bolted to a piece, B', which is curved and attached to the head or bar A, the same as are the shafts B. To the rear side of the bar A is secured a loop or handle, $h$, and also a metallic socket, $e$, as shown in fig. 2.

The implement thus constructed is used as follows: A horse or other animal is attached between the shafts B, the traces being secured to the hooks $b$, as usual in horse hay-rakes. It is then drawn along over the ground, gathering the loose hay as it proceeds, the hay as it accumulates being held by the teeth C and the curved portion of the shafts B and B'. The driver, walking behind, carries in his hand a lever, L, as represented in fig. 3, the lower end of which is fitted to enter the socket $e$, and by the use of which, when necessary, he raises the points of the teeth C to enable them to pass over a mole-hill, root, stone, or other obstruction, and thus prevent the head from being turned over and emptying the hay on the ground, as is usual with the ordinary revolving hay-rake when it strikes any similar obstruction. The implement having thus gathered all the hay it can hold (and it is made much larger than ordinary hay-rakes, so as to hold as much as the animal can conveniently haul) is driven to the stack or other place of deposit, where it is unloaded by the driver, who seizes the handle $h$, and, elevating the head A slightly, causes the points of the teeth C to take hold on the sod, causing the head to revolve, and of course leaving the hay on the ground. The implement is then drawn back to the loose hay in that position, when the head is reversed and the operation repeated.

It will be seen that it is necessary to have the lever L removable at pleasure, as otherwise the head A could not be turned over, as described. By the use of this simple implement the labor of pitching the hay on and off the wagon or cart is entirely obviated, and the use of these latter articles is dispensed with. With my improved implement one boy and a horse can gather and haul more hay than can two men with a team and wagon.

I am aware that rakes with revolving heads have long been used, and such I do not claim; but what I do claim, is—

The reversible head A provided with the teeth C, handle $h$, and socket $e$, journalled to the curved shafts B, and having the runners $a$ attached, all constructed and arranged to operate as set forth.

JOHN ZIMMERMAN.

Witnesses:
H. B. MUNN,
GEO. I. BERGEN,